United States Patent
Waskiewicz, Jr. et al.

(10) Patent No.: US 10,382,343 B2
(45) Date of Patent: Aug. 13, 2019

(54) INTELLIGENT THREAD MANAGEMENT ACROSS ISOLATED NETWORK STACKS

(71) Applicant: NetApp, Inc., Sunnyvale, CA (US)

(72) Inventors: Peter P. Waskiewicz, Jr., Portland, OR (US); Jared Cantwell, Boulder, CO (US); Marshall McMullen, Golden, CO (US); Carl Jeffrey Seelye, Reno, NV (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 15/611,437

(22) Filed: Jun. 1, 2017

(65) Prior Publication Data

US 2018/0287951 A1 Oct. 4, 2018

Related U.S. Application Data

(60) Provisional application No. 62/481,421, filed on Apr. 4, 2017.

(51) Int. Cl.
*H04L 12/851* (2013.01)
*H04L 12/26* (2006.01)
(Continued)

(52) U.S. Cl.
CPC ........ *H04L 47/2441* (2013.01); *G06F 9/5077* (2013.01); *G06F 9/545* (2013.01);
(Continued)

(58) Field of Classification Search
CPC . H04L 43/12; H04L 47/2441; H04L 41/0813; H04L 45/44; H04L 41/0816; H04L 12/24
See application file for complete search history.

(56) References Cited

U.S. PATENT DOCUMENTS 9,405,568 B2    8/2016   Garg et al.
2008/0019359 A1* 1/2008  Droux ................. H04L 12/4641
                                              370/389
(Continued)

OTHER PUBLICATIONS

PCT Notification of Transmittal of the International Search Report and the Written Opinion of the International Searching Authority, or the Declaration, International Searching Authority, International Application No. PCT/US2018/025951, dated Jul. 18, 2018 (16 pages).

(Continued)

*Primary Examiner* — Benjamin H Elliott, IV
(74) *Attorney, Agent, or Firm* — Cesari and McKenna, LLP (57) ABSTRACT

Data traffic of different customers or tenants can be efficiently handled at a shared node while still being isolated from each other. An application instance can create multiple network stack that are isolated from each other and intelligently manage threads across the isolated network stack instances. To intelligently manage the threads across the network stack instances, each thread maintains data that identifies the network stack to which the thread is assigned. With this information, the application can intelligently use a thread already assigned to a network stack that will process the data traffic and avoid the performance impact of a system call to assign the thread to the network stack.

20 Claims, 8 Drawing Sheets

(51) Int. Cl.
*H04L 29/08* (2006.01)
*G06F 9/50* (2006.01)
*G06F 9/54* (2006.01)
*H04L 12/46* (2006.01)
*H04L 12/713* (2013.01)
*H04L 29/12* (2006.01)

(52) U.S. Cl.
CPC .......... *H04L 12/4641* (2013.01); *H04L 43/12* (2013.01); *H04L 45/586* (2013.01); *H04L 61/2007* (2013.01); *H04L 61/2061* (2013.01); *H04L 67/1097* (2013.01); *H04L 67/327* (2013.01)

(56) References Cited

U.S. PATENT DOCUMENTS

| | | | |
|---|---|---|---|
| 2013/0185403 A1* | 7/2013 | Vachharajani | H04L 45/44 709/221 |
| 2017/0041288 A1 | 2/2017 | Stotski et al. | |
| 2018/0287951 A1* | 10/2018 | Waskiewicz, Jr. | H04L 47/2441 |

OTHER PUBLICATIONS

Waskiewicz, PJ, "Scaling With Multiple Network Namespaces in a Single Application", Netdev 1.2—The Technical Conference on Linux Networking, Dec. 12, 2016, retrieved from internet: URL: https://netdevconforg/1.2/papers/pj-netdev-1.2pdf.

* cited by examiner

INTELLIGENT THREAD MANAGEMENT ACROSS ISOLATED NETWORK STACKS

The present application claims the benefit of U.S. Provisional patent application Ser. No. 62/481,421, which was filed on Apr. 4, 2017, by Carl Seelye, Jared Cantwell, PJ Waskiewicz, and Marshall McMullen for *Efficient Use of Containerized Opeartions*, which is hereby incorporated by reference.

BACKGROUND

Operating systems, such as the Linux® operating system (OS), provide mechanisms for isolation of resources. Examples of these mechanisms include jails, zones, and containers. A building block for each of these mechanisms of isolation is a namespace. A Linux OS provides namespaces for mounts, process identifiers, network stacks, users, etc. Each namespace can be considered a hierarchy with nodes of different branches being isolated from each other. This prevents visibility across namespaces. Another building block of isolation is a control group. A control group facilitates resource metering and limiting with hierarchical structuring. Some control groups include a processor control group, a memory control group, and a block input/output control group. Namespaces and control groups together are the building blocks for containers.

Virtual local area networks (VLANs) allow various remote computing systems to communicate as if they resided on a common local area network. Accordingly, network security measures can ensure secure communication occurs between the various remote-computing systems, even if the communication occurs over an otherwise unsecured network. Combined with a VLAN, internet small computer system interface (iSCSI) allows volumes on a storage system to be accessed in a secure way. iSCSI provides an abstraction of where a volume of data is stored on the storage system. To create a connection, a device issues a discovery request for a particular volume to an iSCSI target. In response to this discovery request, the iSCSI target determines where the volume is located and provides the internet protocol (IP) address of where the volume is located. This allows an end user to access a volume of data without having to know, prior to accessing the data, where the data is actually located. This process is called iSCSI redirection.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to virtual local area network (VLAN) technology for traffic isolation in conjunction with intelligent management of threads across isolated network stack instances of a shared node to continue the traffic isolation. Aspects of this disclosure can also use other technologies to isolate traffic across tenants/customers and preserve that isolation in a shared node. Examples of the other technologies include virtual private networks (VPNs) and tunneling technology. In other instances, well-known instruction instances, protocols, structures and techniques have not been shown in detail in order not to obfuscate the description.

Overview

Data traffic of different customers or tenants can be efficiently handled at a shared node while still being isolated from each other. Instead of creating containers for multiple instances of an application or spawning a thread for each of multiple network stacks, an application instance can create multiple network stack instances that are isolated from each other and intelligently manage threads across the isolated network stack instances. To intelligently manage the threads across the network stack instances, each thread maintains data that identifies the network namespace to which the thread is currently assigned. With this information, the application can intelligently use a thread already residing in a network namespace of a network stack instance that will process the data traffic and avoid the performance impact of a system call to assign the thread to the namespace.

VLAN Storage Systems

Figure 1:
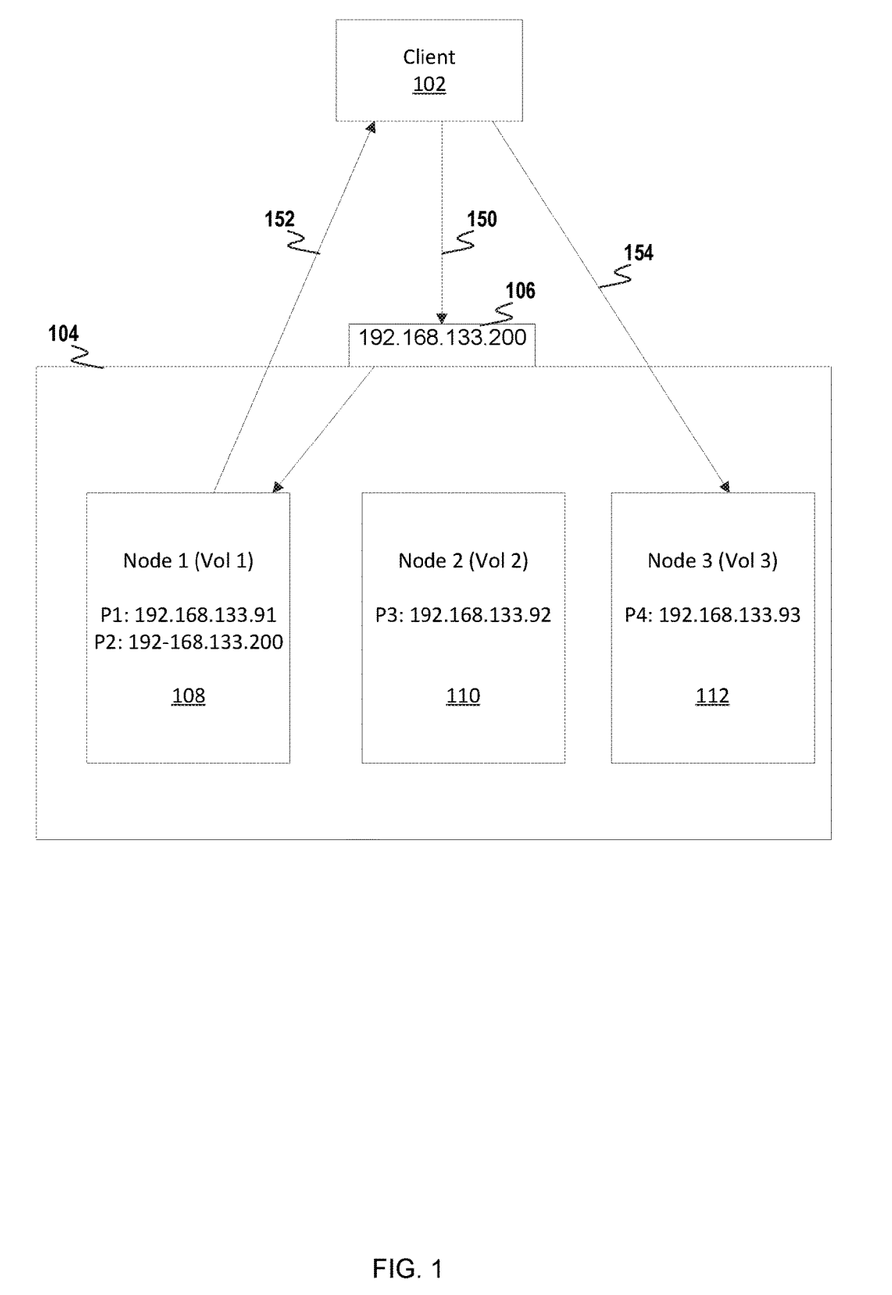
FIG. 1 depicts a storage system supporting iSCSI redirection.

FIG. 1 depicts a storage system 104 supporting iSCSI redirection. The storage system 104 includes nodes 108, 110, and 112. Each node can contain information about one or more volumes of data. For example, node 3 112 includes data associated with a volume 3. This data can include information regarding where data stored on the volume is located. The volume's data can be stored across different nodes. In one implementation, the volume's data is stored randomly across all nodes of the storage system 104. Multiple different clients can access the storage system. These clients can be independent of one another. Data associated with each client, therefore, is inaccessible by other clients. One way to ensure that client data stays separate from one another is to use a separate virtual internet protocol (VIP) address for each client. In this implementation, each VIP is for a cluster of nodes. While the nodes used in various client clusters can overlap, the data stays separated due to the use of different VIPs. For example, a client that accesses the cluster using VIP 106 would not be able to authenticate with a different VIP (not shown in FIG. 1). Accordingly, the client would only be able to access volumes on the cluster associated with the client.

Each volume can be accessed using iSCSI. An end user can use a computing device 102 to access a volume associated with the end user. For example, the client 102 can access volume 3. To do this, the client must now know an IP address 106 that is associated with the storage system 104. A virtual IP address (VIP) is used for this purpose. This IP address is considered to be virtual as the physical device that receives data destined to the VIP changes. An iSCSI initiator, such as the client 102, initially connects to the VIP address 106 as an endpoint. To support iSCSI functions, the VIP address 106 has responsibility for handling all initial iSCSI requests from multiple clients. The actual node or other computing system that is the actual physical destination of this address can change. For example, the hosting computing device can be changed to balance the load from handling iSCSI functions. Importantly, only a single node will host the VIP at any one time. Whichever node handles data received on the VIP listens on a well-known port, e.g., 3260, on the VIP for incoming iSCSI requests.

Allowing various nodes to act as the endpoint of the VIP ensures that if the node that is currently hosting the VIP crashes another node can become the VIP. From the customer's perspective, the VIP is always available and the customer does not have to know which node is acting as the VIP. Accordingly, the VIP is the address that the client 102 uses to connect to iSCSI storage.

One function of the VIP is to direct a client to the node that stores a requested volume. This allows a volume to reside on a different node than the node currently acting as VIP. For example, FIG. 1 illustrates the client 102 requesting access to volume 3. Initially, the client 102 sends a request to the VIP (150). In FIG. 1, node 108 is acting as the VIP so the request is handled by node 108. Node 1 determines which node handles I/O requests for volume 3. For example, a database can store a mapping of volume names to node names or IP addresses. In this example, node 112 handles I/O requests for volume 3. Accordingly, node 108 sends a redirect response to the client 102 that includes the IP address of node 112, e.g., 192.168.133.93, and port that accepts iSCSI commands for volume 3 (152). Upon receipt, the client 102 then performs a new login directly to node 112 (154).

Figure 2:
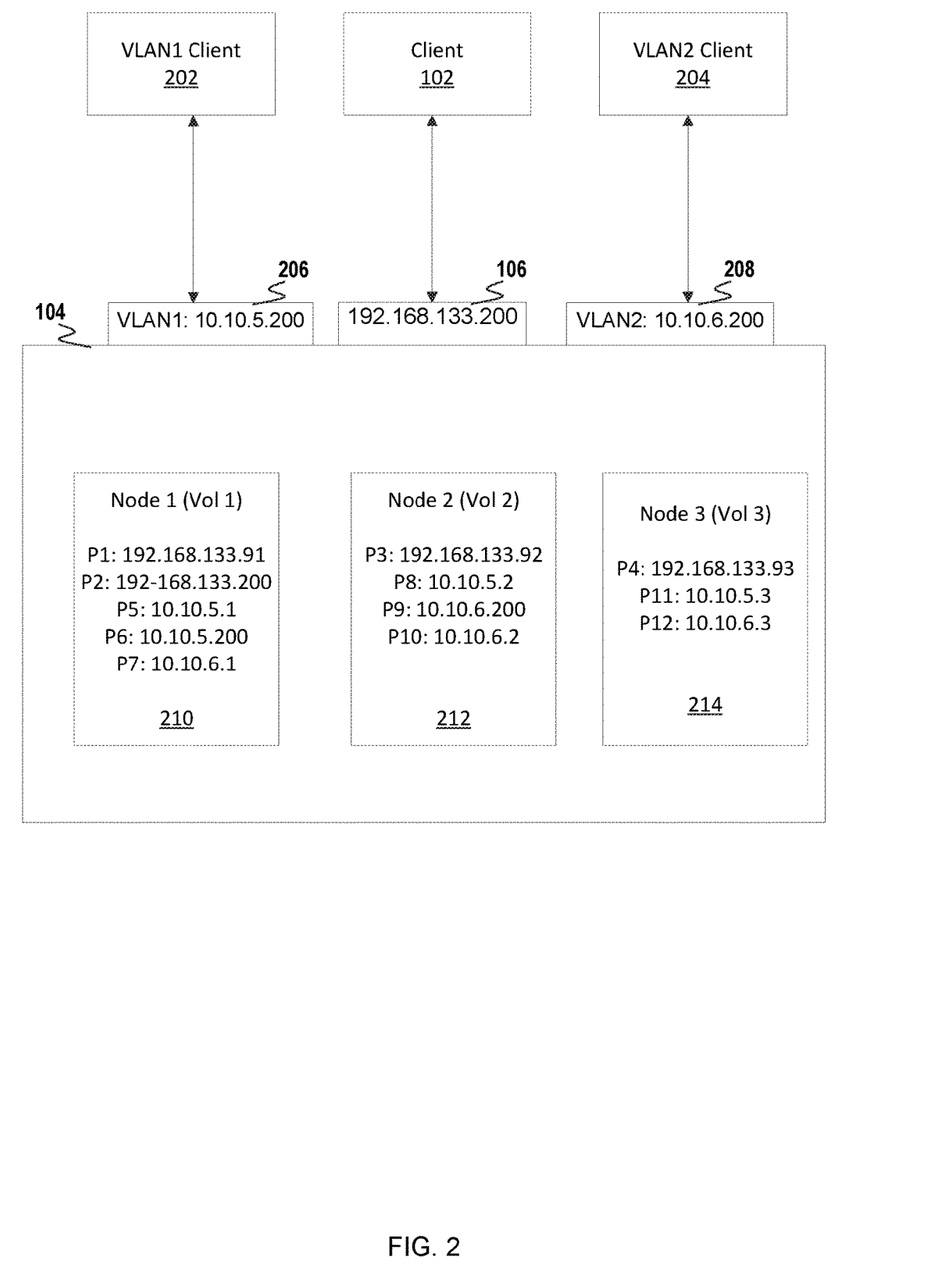
FIG. 2 depicts a storage system supporting iSCSI redirection with multiple VLANs.

This redirection involves two separate types of processes. The first is the VIP process. The second type of process is the process that listens for iSCSI commands that occur on a particular network. In FIG. 1, each node has one process that acts as the iSCSI listening process. Each process listens for iSCSI commands to access volumes that the node hosts. If a particular volume is not hosted on the current node, the node can redirect an iSCSI initiator to the correct node. Note, this is different than the VIP process that redirects iSCSI initiators to the correct node. Rather, each iSCSI listening process can also redirect iSCSI initiators to account for volumes that move from one node to another node. Accordingly, one main difference between the two types of processes is that each iSCSI listening process is not intended to be a redirector process that all clients initially communicate. The VIP process is the process that all clients initially connect to when trying to access a particular volume.

iSCSI redirection can be used in combination with VLANs. FIG. 2 depicts the storage system 104 supporting iSCSI redirection with multiple VLANs. Specifically, the storage system 104 includes three different iSCSI endpoints, VLAN1, a cluster, and VLAN2. The client 102 can use VIP 106 to access volumes on the client's cluster. This is accomplished as described in FIG. 1. In contrast to FIG. 1, FIG. 2 includes two VLANs. Each VLAN is required to have a dedicated VLAN network interface configured on every node with a dedicated VLAN IP address specific to that VLAN. Different network interfaces for each VLAN ensures that packets from different networks are isolated from one another. All incoming and outgoing traffic for a VLAN must come in and go out over the dedicated interface and IP address associated with that VLAN. In addition, VLAN traffic cannot see non-VLAN traffic or traffic on a different VLAN. To ensure this separation of VLAN data, FIG. 2 adds two additional VIPs, one for VLAN1 206 and one for VLAN2 208. Accordingly, a VLAN1 client 202 can access its cluster using VIP 206. Similarly, a VLAN2 client 204 can access its cluster using VIP 208.

In addition to adding VIPs 206 and 208, each node also includes an iSCSI listening process for each VLAN. A VIP process may also be used for each VLAN. In FIG. 2, processes P1, P3, and P4 are the iSCSI listening processes for a cluster of nodes. Processes P5, P8, and P11 are the iSCSI listening processes for VLAN1, while P7, P10, and P12 are the iSCSI listening processes for VLAN2. P2 on node 210, P6 on node 210, and P9 on node 212 are the VIP processes for the cluster, VLAN1, and VLAN2, respectively.

The approach shown in FIG. 2 segregates traffic from different VLANs using separate processes. Adding a new VLAN, therefore, increases the number of processes that operate on each node. For a small number of VLANs, this does not pose difficulty. A large number of supported VLANs, e.g., 100$s$ or 1,000$s$, however, begins to tax system resources significantly. The large number of processes can lead to contention issues as well as extensive memory overhead. Further, each process requires additional threads and sockets. Further, adding and deleting VLANs is also a problem. A storage system with a large number of nodes requires that a process be added to each of the nodes. This makes adding VLANs dynamically unworkable. For example, race conditions would be common in trying to atomically create a process on each of the nodes. Further, how IP addresses are apportioned also becomes an issue.

Figure 3:
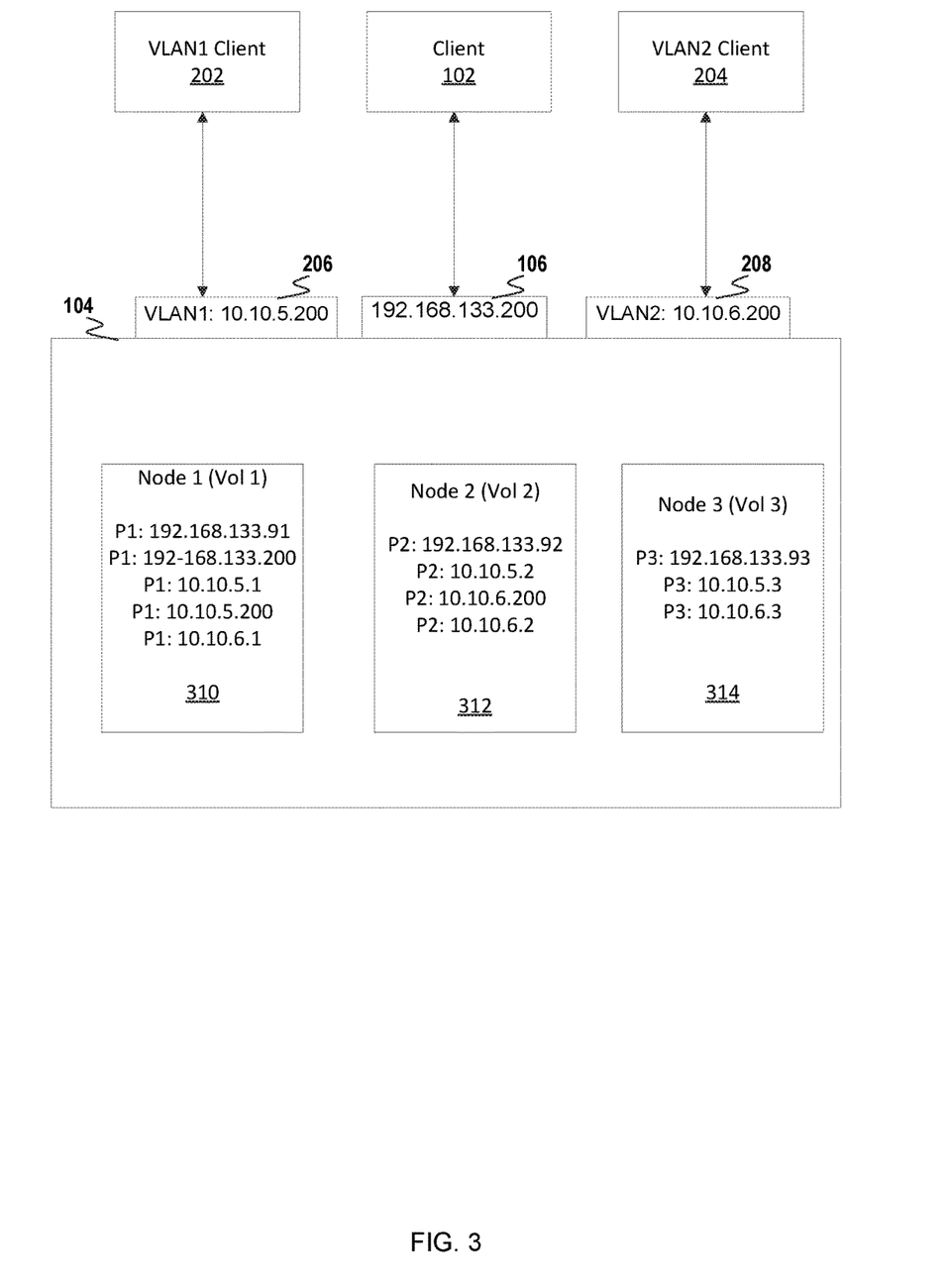
FIG. 3 depicts another storage system supporting iSCSI redirection with multiple VLANs.

FIG. 3 depicts a storage system supporting iSCSI redirection with multiple VLANs according to one embodiment. In FIG. 3, a single wildcard process exists on each node. This process operates as a VIP for any VLAN or cluster, and an iSCSI listening process for every cluster and VLAN. To achieve this is to use an IP address that is bound to every interface of a machine. For example, the IPADDR_ANY IP address can be used, e.g., 0.0.0.0 or ::. In this way, one process listens across all network interfaces of a machine on a particular port, e.g., 3260. In various implementations, the iSCSI traffic uses different IP addresses to differentiate between VLANs but uses the same port. If different ports are used, one process is needed for every distinct port. The IPADDR_ANY IP address acts as a wildcard address that a process can listen on so that the process will receive all packets destined for any interface on a particular port on the machine. The physical and virtual interfaces, however, are still separate. Incoming traffic into a node still stays on its own interface. Only at the final layer in the kernel is all of the incoming traffic collapsed down to the one process listening on the one port bound to IPADDR_ANY. The VLAN requirement that data is segregated across different VLANS, therefore, is achieved.

Using the IPADDR_ANY address, therefore, allows a single process to run on every node. This one process handles all cluster and VLAN traffic. In addition, the iSCSI listening process can also be combined with the VIP process. Accordingly, regardless of how many VLANs are supported in the storage system, each node only has a single process. This one process also handles all non-VLAN packets. Note, each VLAN and cluster has its own unique IP address that is used by external clients to access volumes on a VLAN or cluster.

As noted above, the approach illustrated in FIG. 3 keeps VLAN traffic properly segregated. Accordingly, the security of any VLAN is maintained. No customer iSCSI data passes over the unfiltered catch-all wildcard interface and port. As the wildcard interface can receive data related to different VLANs, the wildcard process must determine how to properly handle iSCSI requests and data. A database can be used to store data used to properly route packets. The database can include data about each volume and node in the storage system. Using this information, the redirector portion of the wildcard process can lookup which node is hosting that volume. Next, all of the IP addresses of that node can be determined.

Repeating the example from FIG. 1, a client can log in to volume 3. A discovery request is sent from VLAN1 client to access volume 3. The client sends the packet to VLAN1's IP address 10.10.5.200. If node 1 is the VIP of VLAN1, the discovery request is handled by the one wildcard process running on node 1. Volume 3 is located on node 3. The issue, though, is what IP address should be returned, as node 3 is addressable by three IP address: 192.168.133.93 for the cluster; 10.10.5.3 for VLAN 1; and 10.10.6.3 for VLAN2. Previously, there was one process for each interface. Accordingly, the return address would be known as there was one process for each VLAN, e.g., for each of the three IP addresses. Now, as there is a single process running, the correct IP address to return must be determined.

To determine the correct IP address to return, the local endpoint that the packet arrived on can be determined. For example, a getsockname( ) method call can be made. In the example above, the traffic was received on VLAN1's VIP, so 10.10.5.200 would be returned. Using this information, the name of the VLAN can be determined from the database. In addition, volume 3 can be determined to be located on node 3. Next, using the name of the VLAN, the IP address on node 3 associated with VLAN1 can be determined, i.e., 10.10.5.3. This is the address that is returned to the client. The client can then connect directly to 10.10.5.3 to access volume 3.

When the client accesses data in volume 3, the wildcard process handles the IO requests. As these requests are not iSCSI discovery requests, an iSCSI listener counterpart of the wildcard process processes the request. This portion of the wildcard process determines the IP address that the client used to connect to node 3. Using this information, the wildcard process can verify that the client is able to connect to the VLAN.

In addition to the reduction of processes needed to support VLANs, the various implementations allow VLANs to be atomically configured. To add a VLAN to a cluster, one or more blocks of IP addresses are received from a client device. For example, a VLAN setup process can receive the block of IP addresses. In addition, a name of the new VLAN and requested VIP of the VLAN can be received. The IP addresses are used to assign to each node one IP address. Each IP address associated with the new VLAN cannot be currently in use in the cluster. To ensure that the VLAN can be created, all currently used IP addresses in the block of IP addresses can be filtered or marked as being in use. The number of unused IP addresses can then be determined. If the number of unused IP addresses is less than the number of nodes in the cluster, the VLAN cannot be setup. In this scenario, a message indicating that a different block of IP addresses is required to setup the VLAN can be returned to the client device. If the number of IP addresses is greater than or equal to the number of nodes in the cluster, the setup of the VLAN can continue.

A database that supports atomic functions is used to atomically setup the VLAN. The IP address assigned to each node and an identifier of the node are stored in the database. This allows the IP address for this VLAN to be determined for each node in the cluster. This atomic feature ensures that if nodes are added to a cluster at the same time a VLAN is being added, the VLAN will be successfully setup with the new node. If the VLAN is not at first successfully installed because a new node was added before the VLAN was successfully added, attempting to add the new VLAN can be retried. In this scenario, as long as no new node was added, an existing node is removed, or using one IP address is duplicated, the adding will be successful. Once a VLAN is added to the database, network interfaces for each node can be created and bound to the appropriate port. In addition, the VIP of the VLAN is bound to an initial node and listens for iSCSI discovery requests on the new VLAN.

Another benefit of this configuration is that numerous different clients can use the storage system. A single client can itself have multiple customers. The client, however, may need to ensure that each customer's data is separate and secure from each other customer. This can be accomplished by providing each customer with its own VLAN. As described above, data in one VLAN is segmented from data in each and every other VLAN.

Secure Mode VLANs

In a VLAN system, for example, implemented in and discussed above with respect to FIG. 3, since a wildcard address is used at each node or volume, the listening node can potentially receive any discovery requests for data (or a volume) from any of the VLAN1 Client 202, the Client 102, and/or the VLAN2 Client 204. As discussed above, node receiving the discovery request also determines the correct IP address for returning the results of the request using the getsockname( ) method call. The address of the data/volume requested by the client can then be returned to the client to redirect the client to the appropriate node and initiate an iSCSI request to access the data. The iSCSI procedure can prevent a client from accessing data/volumes that they do not have access to. However, since a node can receive and return discovery requests from multiple clients, a discovery request response could potentially refer to data/volume that is not authorized to be accessed by a particular client. That is, since the nodes in FIG. 3 operate using a single process that listens for various requests from various clients, those nodes are not limited to determining the location of data/volumes in response to discovery requests for a single client. Even though after answering a request and redirecting a client the client would not be able to access data that is not theirs because of the iSCSI procedure, a client may be able to see that data/volumes they are not authorized to access exist as well as the location of such data. In other words.

Figure 4:
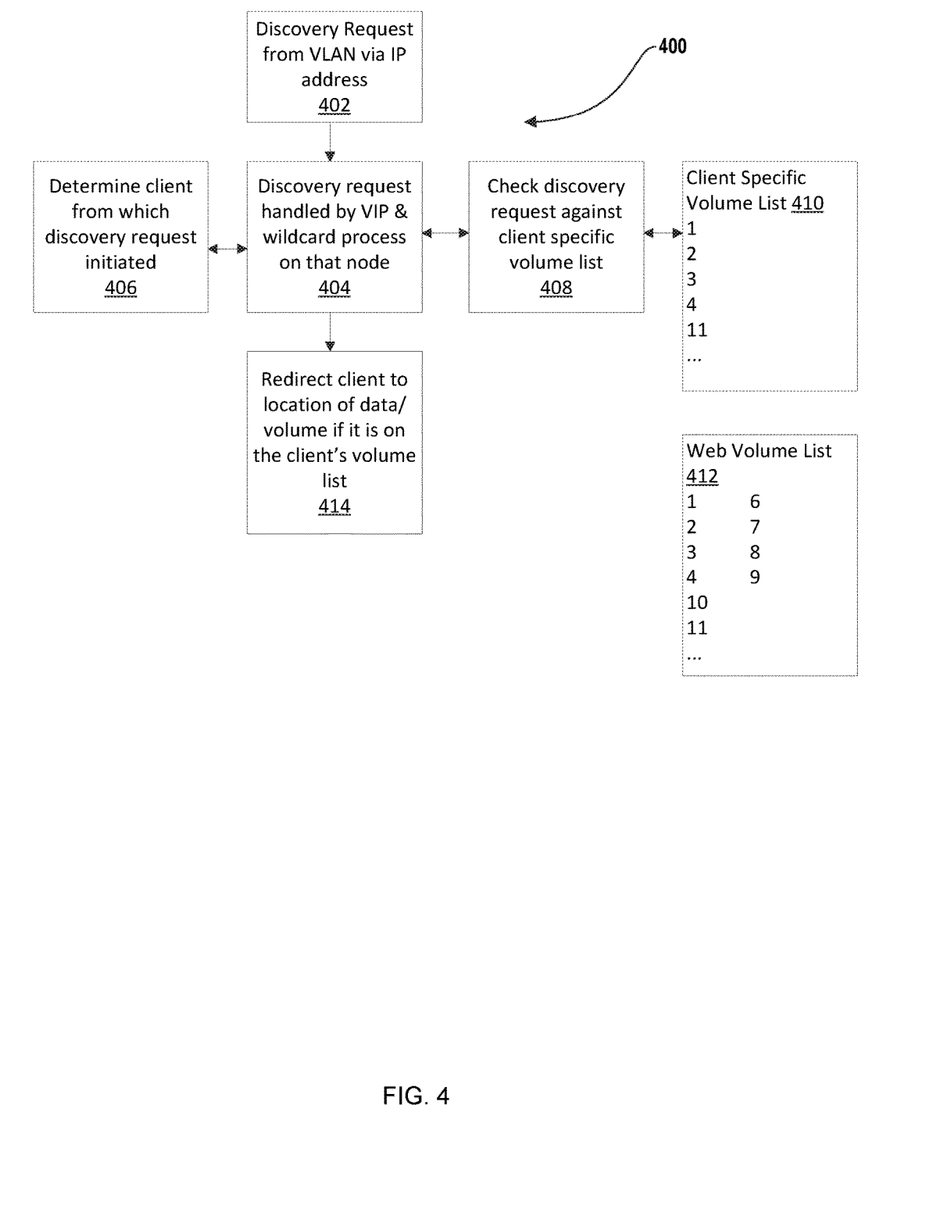
FIG. 4 depicts a flow diagram for a method of supporting iSCSI redirection with multiple VLANs with a secure mode.

FIG. 4 depicts a flow diagram for a method 400 of supporting iSCSI redirection with multiple VLANs with a secure mode in accordance with an illustrative embodiment. In alternative embodiments, fewer, additional, and/or different steps may be performed. Also, the use of a flow diagram is not meant to be limiting with respect to the order of steps performed.

In an operation 402, a discovery request for a data/volume is originated at a client. As one example, the discovery request may originate from VLAN1 Client 202 as shown in and described with respect to FIG. 3. Similar to the sequence shown in and described with respect to FIGS. 1, 2, and 3 above, the discovery request may be for data/volume located on a third node, for example the node 314 of FIG. 3. However, a different node, for example the node 310 of FIG.

3, may be the VIP of the VLAN1 Client 202. Accordingly, the discovery request from the VLAN1 Client 202 will be handled by a wildcard process on the node 310 in an operation 404.

In the operation 404, and as described above with respect to FIG. 3, the VIP can determine a correct IP address to return the results of the request to. In this example, the node 310 would determine that the discovery request originated with the VLAN1 Client 202 and, after determining where the volume/data that is the subject of the request is stored, and send back to the VLAN1 Client 202 the location of the data/volume on the node 314. This determination occurs in an operation 406.

However, prior to returning the location of the requested data/volume to the client (and subsequently redirecting the client to the third node to initiate an iSCSI procedure to retrieve the data/volume from the third node), the first node 310 checks the discovery request against a client specific volume list 410 in an operation 408. The client specific volume list 410 is an index or database of every volume that the VLAN1 Client 202 has access to. Some of the volumes may be exclusive to the VLAN1 Client 202, and other volumes may be accessible by the VLAN1 Client 202 and other clients. Still other volumes may be accessible by other clients and not the VLAN1 Client 202. In this scenario, such a volume would not appear on the client specific volume list 410 for the VLAN1 Client 202. In alternative embodiments, a client's specific volume list may include multiple client specific volume lists that are checked when a discovery request is made. For example, if a client is part of different groups/security domains that grant access to different data/volumes, the client may essentially have multiple specific volume lists. In practice, when authorizing a discovery request, the system may combine each of these volume lists to run a single check, or similarly may check each volume list in sequence to determine whether the client should be authorized to request location information (volume ID) for particular data/volumes. In some embodiments, the system may not check an entire client specific volume list or lists. For example, if the system finds a match on the client specific volume list(s), it is not necessary to check the rest of the volume list(s). Such a method can preserve resources in the system.

FIG. 4 also shows a web volume list 412. While the client specific volume list 410 shows volume IDs assigned to or accessible to the VLAN1 Client 202, the web volume list shows all of the volume IDs that exist in a storage system (e.g., the storage system 104 of FIGS. 1-3). Accordingly, every volume ID that has something stored on the storage system is shown in the web volume list, regardless of what node the volume is stored on or how many nodes there are. The volume IDs refer to specific physical memory locations. Accordingly, whatever is stored in the specific locations can be indicated by the volume ID. The volume IDs on the client specific volume list 410 all appear on the web volume list 412 (e.g., 1, 2, 3, 4, 11). The web volume list 412 also includes volume IDs that are not on the client specific volume list 410 that are not allocated to or accessible to the VLAN1 Client 202 (e.g., 6, 7, 8, 9, 10). Since they are on the web volume list 412, however, they are accessible to at least one other client and/or VLAN. Similarly, volume IDs that occur on both the web volume list 412 and the client specific volume list 410 may be on other clients/VLANs volume list, and thus accessible to those other clients/VLANs. This may occur where clients store identical volumes, and thus it is more efficient for the storage system to store only one instance of the data. Other volume IDs that can store data/volumes in a storage system may be empty and do not currently contain data (e.g., 5). Such volume IDs may have previously had data stored there, but may have been removed by a garbage collector process after a determination that no clients are linking to the data at a particular volume ID. If a discovery request includes a request for data at the volume ID 5, for example, the system may return an error message, dynamically store/create new data at the volume ID, or run a process to determine if the requested data is actually stored somewhere else (located at a different volume ID).

As discussed above, at the operation 408, the node determines if the data/volumes requested in the discovery request are on the client specific volume list 410, where the client is determined at the operation 406. Determining whether the data/volumes are on the client specific volume list 410 occurs before the client is redirected to the actual location of the data/volumes at an operation 414. The operation 408 occurs before the operation 414 to ensure that information about a volume or about redirection to a volume location that a client is not authorized for is not sent to that client.

Further, at the operation 414, the client can be redirected by information from the node as disclosed herein to retrieve and/or access the data/volumes sought in the discovery request. For example, the operation 414 may initiate an iSCSI process for accessing and retrieving data from the third node 314. Such a process may be similar to that of FIG. 1, where, as discussed above, the node 310 (after verification at the operation 408) sends a redirect response to the VLAN1 Client 202 that includes the IP address of the node 314 port that accepts iSCSI commands for the volume sought to be accessed. This redirect response is demonstrated, for example, by 152 of FIG. 1. Upon receipt, the VLAN1 Client 202 can perform a new login directly to the node 314. This direct login is demonstrated, for example by 154 of FIG. 1.

The systems and methods disclosed herein offer flexibility and security for storage systems. For example, VLANs for multiple clients can be grouped together to allow volumes to visible to different VLANs. For example, groups/security domains of clients that are part of a single entity may have access to all of the same volumes. In another example, subsets of a group/security domain of clients may have access to all of the same volumes. As a result, multiple grouped clients could use a common VLAN when accessing a storage system as disclosed herein, which would result in secure use of the storage system for the group of clients without requiring a multitude of separate VLANs for each client device.

Further, groupings of clients can be leveraged to maintain and use fewer client specific volume lists. This could occur regardless of whether clients are grouped together to use a common VLAN. In this example, multiple grouped clients would have discovery requests that originate from those clients checked against the same client specific volume list. As such, the list may be more accurately characterized as a client grouping specific volume list or a security domain specific volume list. Using one volume list for multiple clients allows the storage system to store and maintain fewer volume lists for a given number of clients (fewer compared to having one volume list for every client). In these grouping embodiments, the clients should be grouped (either through a common VLAN and/or by associating multiple VLANs with a common volume list) before discovery requests are made. This ensures that once a discovery request is made, the system checks the discovery list against an appropriate volume list that indicates whether the client should be sent information relating to the requested data/volumes and their respective locations.

The systems and methods described herein also define a security/authentication for the network layer of the system, rather than the iSCSI layer where data is actually accessed. This adds another layer of security and protection for clients storing data on the storage system.

Nodes can be prevented from answering requests from clients in a way that would provide information to clients about data/volumes that those clients are not authorized to access. This procedure can be used even if different clients have access to some common volumes, which is particularly helpful for groups of clients or security domains that share some common data.

Intelligent Management of Limited Threads Across Isolated Network Stacks

As previously mentioned, an application can be programmed to manage threads across separate network namespaces to preserve the segregation of traffic of different VLANs being handled by a shared node. To manage the threads, the application instance maintains associations between the VLANs and the network namespaces and reads the context information maintained by the threads in thread level storage (e.g., a variable in stack/memory space of the thread). The description refers to this functionality of the application instance creating network namespaces and managing threads across the network namespaces as "containerizing operations" since the replication or cloning is limited to the network stacks instead of expending resources on multiple instances of the application.

The term "node" is used to refer to a collection of processes that handle client requests and may or may not also include the hosting hardware (e.g., computer, blade, machine, appliance, etc.). For instance, a storage node is a collection of processes that coordinate and/or cooperate to service storage requests from clients. The collection of processes for a node includes one or more processes of the application instance.

The term "network stack instance" is used to refer to a collection of network related resources assigned to or within a network namespace. Examples of these resources include interfaces, an address space, a routing table, etc. When a network namespace is created, an operating system may instantiate a default network stack for the network namespace (e.g., default virtual interface, IP address space, etc.). Additional resources can be assigned to a network namespace.

Figure 5:
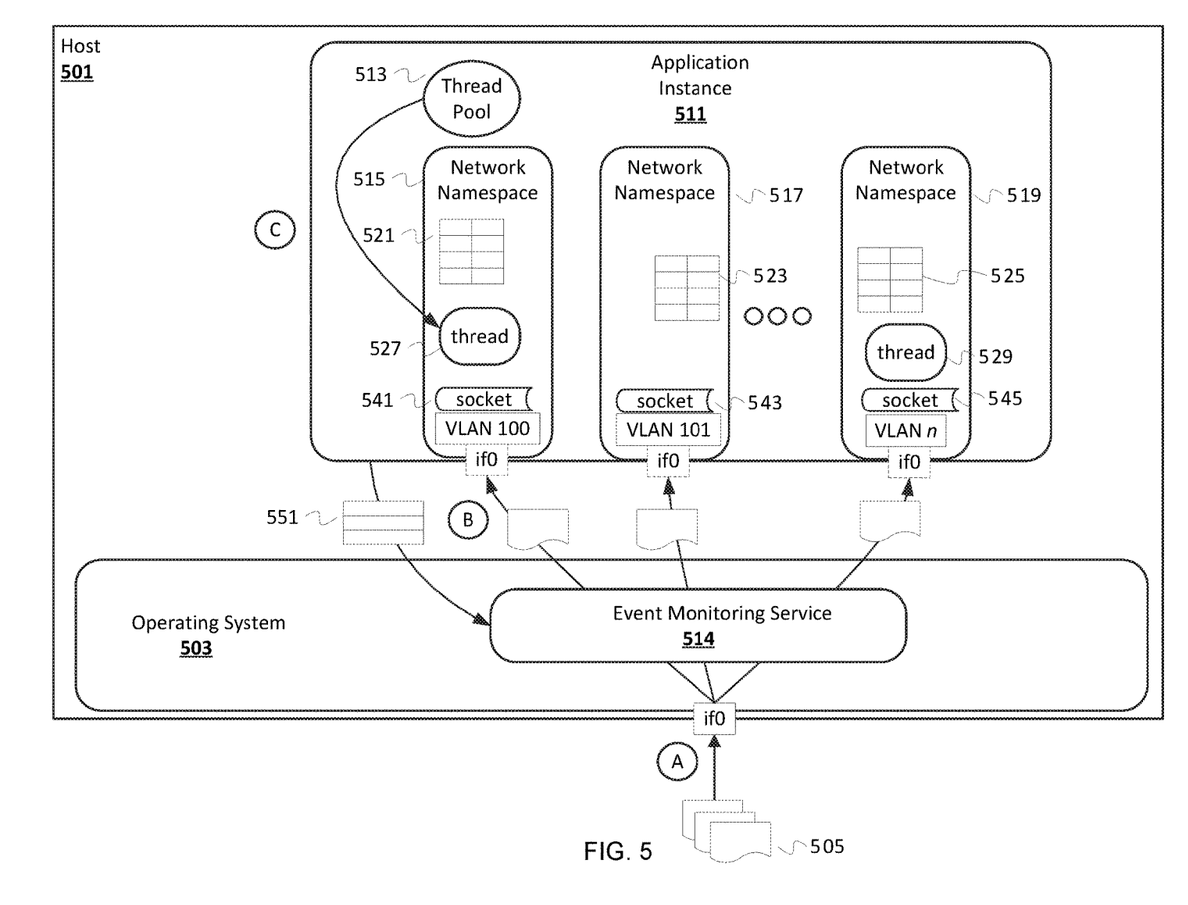
FIG. 5 depicts is a conceptual diagram of an example application instance managing threads across multiple network stack instances within network namespaces.

FIG. 5 is a conceptual diagram of an example application instance managing threads across multiple network stack instances within network namespaces. A host 501 hosts an operating system 503 and an application instance 511. In FIG. 5, the application instance 511 has already created several network namespaces 515, 517, 519, each of which contains an instance of a network stack. In addition, the application instance 511 has already assigned sockets and VLANs to the network namespaces.

To assign the sockets, the application instance 511 invoked system calls to create the sockets with socket addresses based on the address spaces of each of the network namespaces. For instance, the application instance 511 created the socket 541 with a request to the operating system 503 to create a socket and an indication of a network address within an address space of the network stack contained within the network namespace 515. The application instance 511 also invoked a command to assign the socket to the network namespace.

At some point after creation of the sockets, the application instance 511 invokes an event monitoring service 514 (e.g., invokes the epoll( ) system command). The application instance 511 can pass a list of socket identifiers to the event monitoring service 514. With reference to the epoll call, the application instance 511 can execute one or more commands to register a set of the file descriptors of the sockets 541, 543, and 545 for monitoring. Implementations can use other services or system calls of a supporting operating system that has visibility of the sockets or buffers within each of the isolated network stack instances.

To assign the VLANs, the application instance has linked each VLAN to an interface if0 within each of the network namespaces by VLAN tag. FIG. 5 illustrates a few example elements of the network stack instances along with the VLANs to network namespace assignments. The network namespace 515 contains a routing table 521, a socket 541, and a representation of VLAN 100 linked to an interface if0. The network namespace 517 contains a routing table 523, a socket 543, and a representation of VLAN 101 linked to the interface if0. The network namespace 519 contains a routing table 525, a socket 545, and a representation of VLAN n to the interface if0. The interface if0 corresponds to a physical interface of the host 501. Linking the different VLANs to the interface if0 logically split the interface if0 into different interfaces since each VLAN represents a logically separate network or subnetwork. Accordingly, FIG. 5 depicts the interface if0 as represented in the operating system 503 (e.g., network namespace of the operating system) and the combination of the interface if0 with the different VLAN tags in the different network namespaces 515, 517, 519.

The application instance 511 can perform the creation of the network namespaces and assignments of resources to the network namespaces in response to commands submitted to the application instance 511 and/or based on a configuration file. For example, a configuration file can specify a number of network namespaces to create, names of the network namespaces, and assignments of resources to the network namespaces. At startup, the application instance 511 can read the configuration to create and configure hundreds of namespaces, resulting in the instantiation of hundreds of network stacks isolated from each other. This facilitates the efficient launch of an application with sufficient network stacks to securely handle segregated data traffic on a large scale (e.g., millions of input/output operations per second (TOPS)).

Although numerous network stacks can isolate large scale traffic, a thread cannot be dedicated to each of the network stacks without exhausting the resources of the host 501. To balance resource consumption while serving large scale traffic, the operating system 503 allocates a thread pool 513 to the application instance 511. The thread pool 513 can be tuned to adapt to load from traffic. Regardless of tuning, the number of threads of the thread pool 513 will be less than the number of network namespaces and context switching will be done. Although maintaining hundreds of threads for hundreds of network namespaces can exhaust resources, making system calls to an operating system to switch threads among network namespaces for every network transaction also becomes costly when handling large scale traffic. Therefore, the application instance 511 intelligently manages switching of threads from the thread pool 513 into the network namespaces 515, 517, 519 to avoid switching calls to the operating system 503. Each thread managed by the application instance 511 maintains within thread-local storage an indication of the network namespace in which the thread resides (i.e., network namespace in which the thread is executing (if active state) or was executing (if in wait state)). This information allows the application instance 511 to determine when a thread can be tasked with network processing work without a call to assign the thread to the network namespace.

FIG. 5 depicts three general stages with the sequence of letters A, B, and C. Each of these stages represents a set of operations and not a particular operation.

Stage A represents receipt of data traffic 505 at the interface if0 of the host 501. The traffic 505 consists of traffic from different VLANs. Stage B represents the traffic being written to the appropriate socket according to the VLAN tags and socket addresses within the traffic units. For traffic of VLAN 100, a device driver of the interface if0 writes the data to the socket 541 contained within the network namespace 513. The device driver writes the data of the VLAN 101 to the socket 543 contained within the network namespace 517 and data of the VLAN n to the socket 545 contained within the network namespace 519. Stage C represents the application instance performing operations to intelligently assign threads from the thread pool 513 to the network namespaces 515, 517, 519 to process the traffic 505 of the various VLANs. In the illustration, the thread 529 was last assigned to the network namespace 519. No threads are assigned to the network namespace 515, 517. The ellipsis between network namespaces 517, 519 indicate that only a few of numerous network namespaces are depicted for practicality. The application instance 511 reads a variable in the thread-local storage of each thread that indicates a network namespace or a null value. The application instance 511 determines that the thread 529 is already assigned to the network namespace 519 and tasks the thread 529 with processing the data in the socket 545. For instance, the application instance 511 calls a function to wake the thread 529 with arguments that include a reference to network communication protocol processing code and the socket identifier of the socket 545. The application instance 511 determines that no thread is assigned to the network namespace 515. The application instance 511 makes a system call to assign an idle thread 527 from the thread pool 513 to the network namespace 515, wakes the thread 527, and tasks the thread with processing the data in the socket 541. The application instance 511 may do the same for the data in the socket 543 of the network namespace 517 (i.e., assign and task a thread from the thread pool 513) or switch an idle thread from a different network namespace if none remain unassigned in the thread pool 513.

Figure 6:
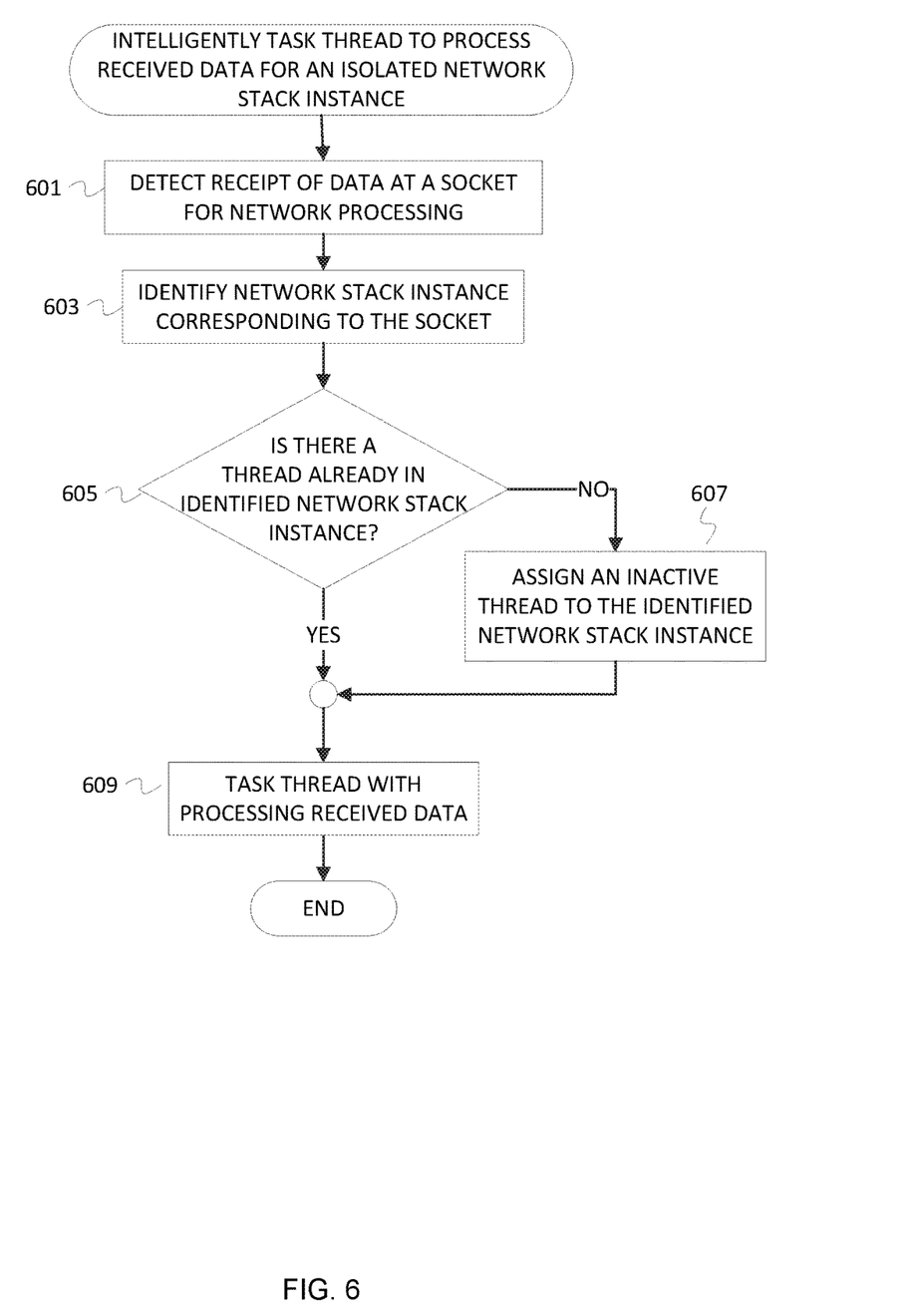
FIG. 6 is a flowchart of example operations for intelligently tasking a thread to process received data for an isolated network stack instance.
Figure 7:
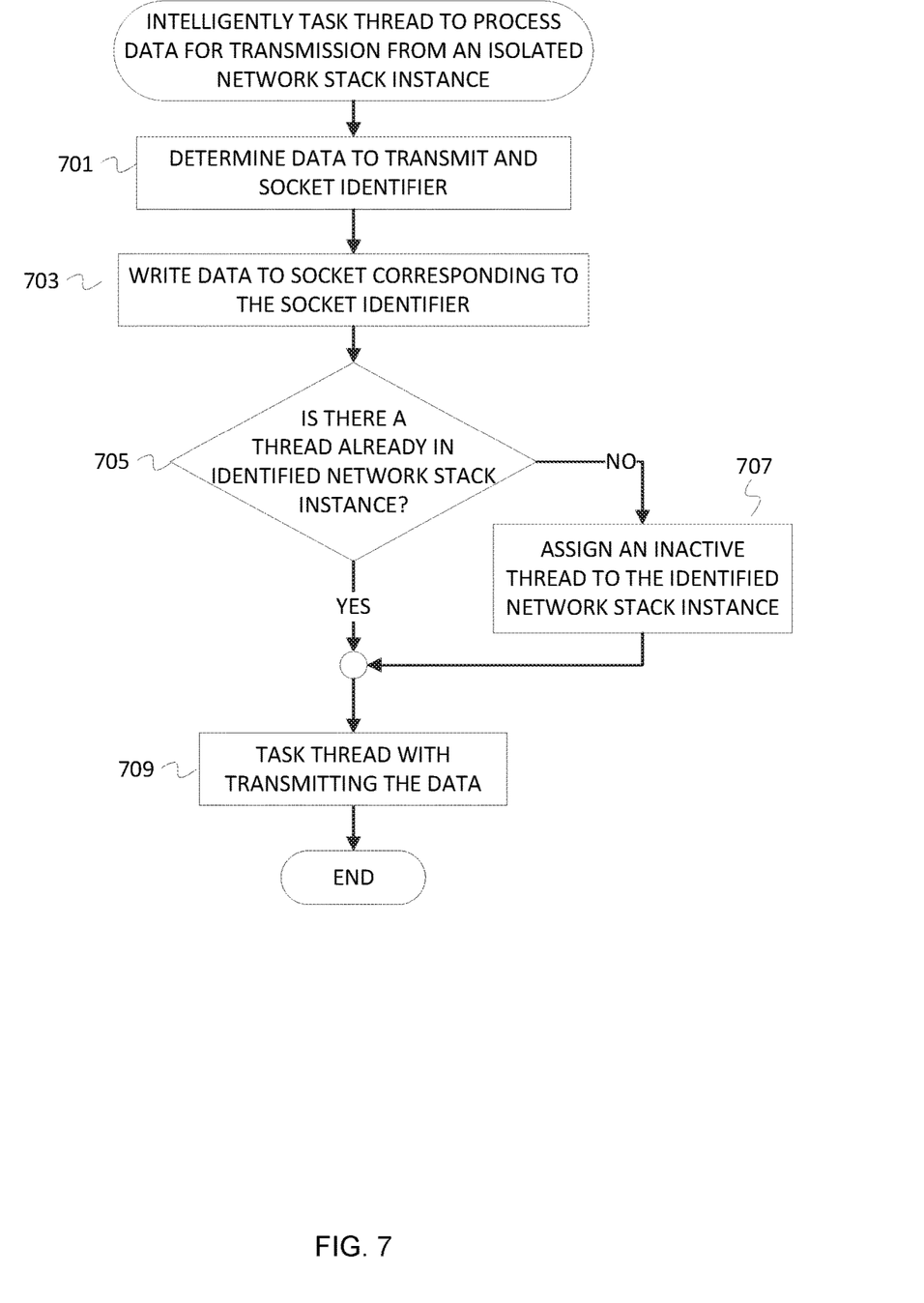
FIG. 7 is a flowchart of example operations for intelligently tasking a thread to process data for transmission from an isolated network stack instance.

Although the illustration of FIG. 5 refers to network namespaces to isolate network stack instances, embodiments can use other isolation mechanisms (e.g., Linux containers or LXC). Regardless of the particular implementation, the network stack instances are isolated from each other and managed by an application instance. In addition, FIG. 5 referred to a host machine or host device that hosted the OS, application instance, and network stack instances. However, the host can also be a virtual host. FIGS. 6-7 are flowcharts of example operations for handling traffic across the isolated network stack instances with more general terminology than that used in FIG. 5.

FIG. 6 is a flowchart of example operations for intelligently tasking a thread to process received data for an isolated network stack instance. FIG. 6 refers to an application instance performing the operations.

At block 601, an application instance detects receipt of data at a socket for network processing. The application instance detects receipt of data based on a notification from a background process or service that has a global view of the network stack instances. The application instance has previously registered the socket, along with other sockets, for monitoring. The monitoring may use callbacks or iterate over the sockets, for example.

At block 603, the application instance identifies the network stack instance corresponding to the socket. The notification received by the application instance identifies the socket. With the socket identifier, the application instance reads the socket structure to determine the network stack instance to which it is assigned, which was set when the socket was created. The socket structure can identify the network stack instance with an identifier of the logical encapsulation that isolates the network stack instance (e.g., namespace identifier, container identifier, etc.).

At block 605, the application instance determines whether there is a thread already in the identified network stack instance. As with the sockets, the application instance can access the thread-local storage of the threads allocated to the application instance. The application instance can read a network stack assignment variable in the thread-local storage of each thread until encountering a match with the network stack instance as identified in the socket structure or finishing traversal of the threads network stack assignment variables. As another example implementation, the application instance can track its own assignments of the threads since the application instance invokes the systems calls to assign the threads. The application instance can maintain a listing of assignments of thread identifiers to network stack instance identifiers and examine the listing to determine whether a thread is already assigned to the network stack instance identified in the socket structure. If no thread is already assigned to the identified network stack instance, then the process flows to block 607. Otherwise, the process flows to block 609.

At block 607, the application instance assigns an inactive thread to the identified network stack instance. The application instance makes a system call (i.e., invokes an OS function or function of an OS tool) to assign the inactive thread to the identified network stack instance. The process continues to block 609.

At block 609, the application instance tasks the thread with processing the received data. If the thread is a general thread, the application instance can invoke a function that passes a pointer to the input stream of the identified socket and a reference to network protocol processing program code. The code for the thread may already incorporate network protocol processing code, in which case the application instance passes the input stream pointer. In some cases, the application instance may invoke a separate function call to wake the inactive thread.

FIG. 7 is a flowchart of example operations for intelligently tasking a thread to process data for transmission from an isolated network stack instance. FIG. 7 also refers to an application instance performing the operations.

At block 701, an application instance determines data to transmit and a socket address for the data. The application instance may be serving a read request that specifies a particular volume for a particular VLAN. After obtaining data from a storage device corresponding to the volume and performing any other processing that isn't network communication protocol related (e.g., encrypting), the application instance reads a socket identifier that persisted from the request. For instance, the socket identifier traveled with a storage command resulting from output from the network stack instance. The socket identifier is an internal identifier that uniquely identifies the socket for the host system and is distinct from the socket address.

At block 703, the application instance writes the obtained data to a socket corresponding to the socket identifier. As a result, the application instance will receive notification from the monitoring process/service of work to do at the socket with identification of the network stack instance in the socket structure.

At block 705, the application instance determines whether there is a thread already in the identified network stack instance. The application instance can access the thread-local storage of the threads allocated to the application instance. The application instance can read a network stack assignment variable in the thread-local storage of each thread until encountering a match with the network stack instance as identified in the socket structure or finishing traversal of the threads network stack assignment variables. As another example implementation, the application instance can track its own assignments of the threads since the application instance invokes the systems calls to assign the threads. The application instance can maintain a listing of assignments of thread identifiers to network stack instance identifiers and examine the listing to determine whether a thread is already assigned to the network stack instance identified in the socket structure. If no thread is already assigned to the identified network stack instance, then the process flows to block 707. Otherwise, the process flows to block 709.

At block 707, the application instance assigns an inactive thread to the identified network stack instance. The application instance makes a system call (i.e., invokes an OS function or function of an OS tool) to assign the inactive thread to the identified network stack instance. The process continues to block 709.

At block 709, the application instance tasks the thread with processing the data for transmission. In some cases, the application instance may invoke a separate function call to wake the inactive thread.

As just one example, containerizing operations may be valuable for integrating additional clients into the storage system 104 of FIG. 3 without having to make significant changes to the system 104 or the old and new clients. For example, the new clients may currently use a storage system that is locally stored. The new clients may wish to integrate to a cloud and internet based storage system. If the system 104 is already based in the cloud, it is possible that some of the routing processes, IP addresses, and communications of the old local system may be similar to the old client's system that is already in use in the cloud. In order to integrate in the new clients into the system 104 without duplicating an OS or application managing the storage, the new clients can be integrated using the containerized operations methods disclosed herein. In this way, both the new and old clients can receive and transmit to the storage system 104 using the same addresses and port (e.g., 3260). However, utilizing the systems and methods disclosed herein, the traffic associated with clients using different VLANs can be segregated using the containerized operations. In other words, even though multiple clients are utilizing the same storage system 104 in the same way, traffic associated with one VLAN cannot be seen by clients associated with other VLANs. This also allows the storage system 104 to serve a greater number of clients more efficiently, as the storage system does not need to rewrite instances of itself for each network stack it instantiates. Such methods may utilize large memory footprints, and require much larger distributed systems to operate at scale (i.e., with lots of clients). Clients' traffic is segregated into different containers (and subsequently different, independent sockets or network stacks). By arranging a system in this way, many different clients can use the same storage system 502, which can include common nodes/volumes, operating systems (OS), and applications (e.g., to respond to and fulfill iSCSI requests). By utilizing common aspects of the system, total system resources used can be reduced or streamlined. However, the clients do not sacrifice security or privacy because any communications between a storage system and a client is segregated from the traffic of other clients.

A user of the systems and methods disclosed herein may be associated with one or more clients. Those clients may be associated with one or more VLANs. By containerizing operations based on VLANs, a user can segregate traffic of their clients by setting up multiple VLANs for their clients. For example, different types of accounts within a user organization may have different levels of access to different information, so it may be desirable to separate the client traffic of those individual accounts with different VLANs and utilize the containerized operations to ensure that those accounts' traffic is segregated. Additionally, other users of the systems and methods disclosed herein may be associated with different, additional VLANs. Accordingly, different users' traffic will also be segregated using the systems and methods disclosed herein. In some embodiments, the system might associate more than one VLAN with a particular space or container. In this way, the communications monitoring module 504 can determine that an operation is associated with a container when it is associated with one of any of the VLANs associated with that container.

FIG. 3 shows all nodes (e.g., 310, 312, 314) listening to all requests coming from all three clients (e.g., 202, 102, 204) through a port designated for iSCSI requests (e.g., 3260). This functionality helps, as disclosed above, to minimize the number of processes being run on each node. This functionality also allows the whole system to function more efficiently, instead of having to run a separate listening process for every location on each node, as described with respect to FIG. 3. Accordingly, the methods and systems described above with respect to FIG. 5 allows different clients to communicate with the same port (e.g., 3260) of a storage system, without that traffic being visible to each other. In other words, the systems and methods disclosed herein allow a system to segregate traffic into different containers or namespaces that are related to different VLANs. This traffic can be properly segregated without having to point the clients to different ports or having to create separate instances of the software application managing a storage system. In other words, containerize the network component operations of an application can be replicated and containerized, but the whole application that is running the processes, filing iSCSI requests, etc. is not duplicated or containerized. In this way, each client and/or VLAN can continue to point at the same port (e.g., 3260), but the traffic through that port is still segregated by into different containers according to each clients' VLAN. As discussed above, this may be valuable where a client's storage is moved to the cloud. If storage for different VLANs was previously physically separated, the traffic was also separated (even if the ports used by different clients with different VLANs had similar names like 3260). However, moving all the data to the cloud could cause different clients with different VLANs to be directing requests/traffic to the same destination ports, unless the cloud network and/or clients are reconfigured. By containerizing the network components (ports) according to VLAN, the client side and the data management side in the storage system does not have to change. Instead, the containerized network operations as disclosed herein can be implemented, allowing for the client and storage systems' configurations to remain the same, yet still segregate the traffic according to different VLANs. Another advantage is that certain protocols, such as iSCSI, specify certain ports to be used (e.g., the 3260 port). Clients on various VLANs can continue to point at a particular port without having their traffic exposed to each other. This provides opportunities to continue using protocol norms, and avoids redefining protocol norms to separate traffic between clients.

One or more flow diagrams have been used herein. The use of flow diagrams is not meant to be limiting with respect to the order of operations performed. The herein-described subject matter sometimes illustrates different components contained within, connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
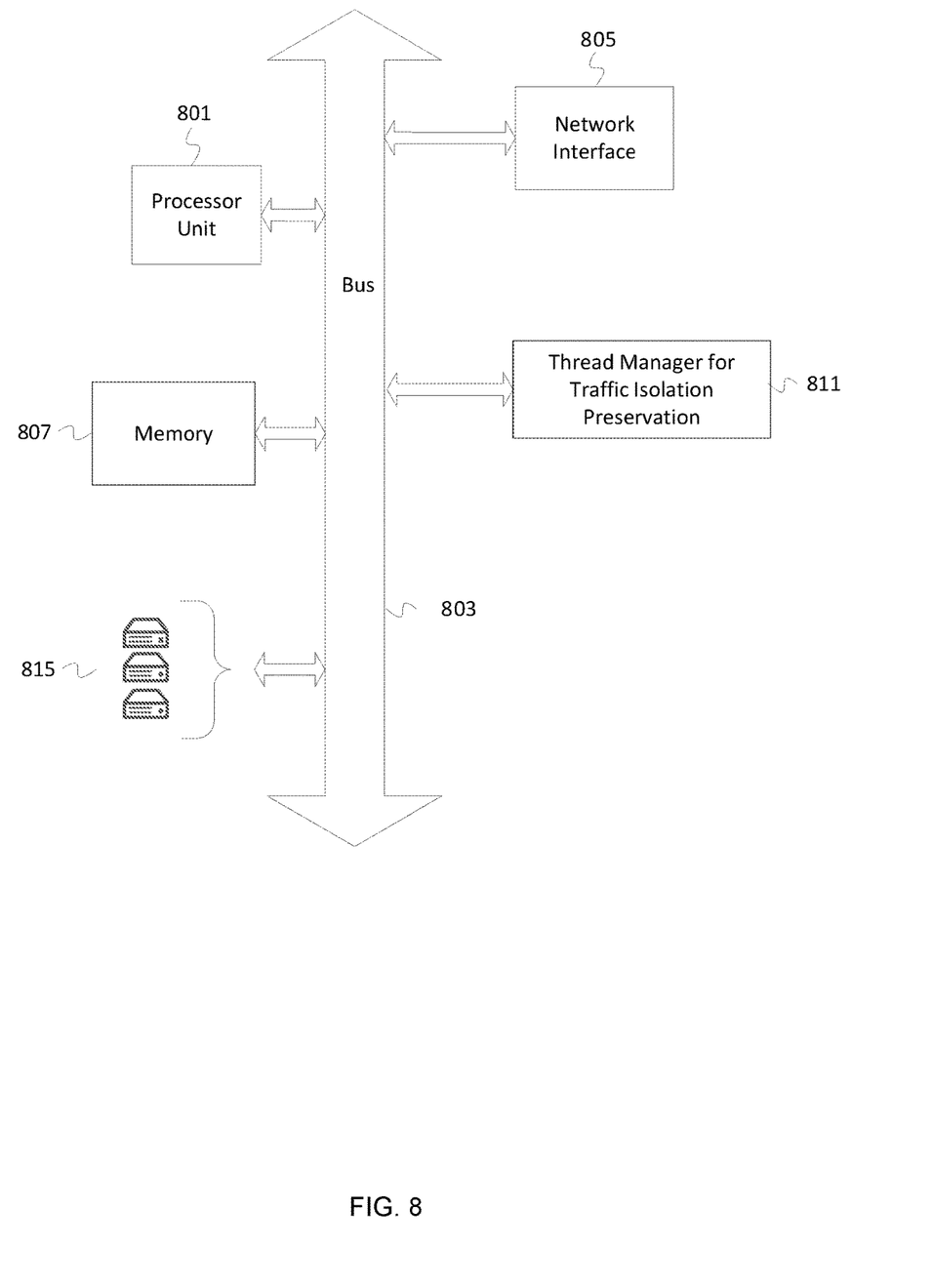
FIG. 8 depicts an example computer system with a thread manager for traffic isolation preservation.

FIG. 8 depicts an example computer system with a thread manager for traffic isolation preservation. The computer system or host includes a processor 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a network interface 805 (e.g., a Fiber Channel interface, an Ethernet interface, an internet small computer system interface, SONET interface, wireless interface, etc.). The computer system also includes a thread manager 811. The thread manager 811 is incorporated into an application or used by an application that creates and manages multiple isolated network stacks. The application uses the multiple isolated network stacks to preserve segregation of segregated traffic received at the computer system—each network stack can correspond to a different logical network or subnetwork or grouping thereof. The thread manager 811 assigns threads to the isolated network stacks taking into account existing thread assignments to avoid the cost of calls to the underlying operating system to switch/assign the threads to the network stacks. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor unit 801. The system also includes a set of storage devices 815 which can include solid state storage devices, disk storage devices, a mixture of different types of storage devices, etc. The storage devices 815 may be connected to the system via interfaces that are not network interfaces and can be connected via the network interface 805.

While the aspects of the disclosure are described with reference to various implementations and exploitations, it will be understood that these aspects are illustrative and that the scope of the claims is not limited to them. In general, techniques for extracting a network address of a node for cluster configuration as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   detecting data for network processing at a first of a plurality of sockets created by an application instance executing on a node;
   identifying a first network stack instance of a plurality of network stack instances corresponding to the first socket, wherein each of the plurality of sockets corresponds to a different logical network;
   determining whether one of a plurality of threads is already assigned to the first network stack instance, wherein the plurality of threads have been allocated to the application instance;
   based on a determination that a first of the plurality of threads is assigned to the first network stack instance, tasking the first thread with processing the data according to the first network stack instance; and
   based on a determination that no thread is assigned to the first network stack instance, invoking a system call to assign the one of the plurality of threads to the first network stack instance.

2. The method of claim 1, wherein detecting data for network processing at the first socket comprises receiving a notification from a monitoring service of an operating system that data was written to the first socket.

3. The method of claim 2, wherein identifying the first network stack instance comprises accessing a socket structure of the first socket to read a variable that identifies the first network stack instance.

4. The method of claim 3, wherein the variable identifies the first network stack instance with an identifier of a logical encapsulation that isolates the first network stack instance from others of the plurality of network stack instances.

5. The method of claim 2 further comprising registering the plurality of sockets with the monitoring service.

6. The method of claim 1, wherein determining whether one of a plurality of threads is already assigned to the first network stack instance comprises accessing thread-local storage of the plurality threads to determine whether a variable in the thread-local storage identifies the first network stack instance.

7. The method of claim 1, wherein identifying the first network stack instance comprises:
   determining a logical network identifier associated with the first socket, wherein identifying the first network stack instance comprises determining that the first network stack instance is also associated with the logical network identifier.

8. One or more non-transitory machine-readable media comprising program code for preserving data traffic segregation on a shared node, the program code to:
   create for an application instance a plurality of network stack containers;
   assign each of a plurality of sockets to a different one of the plurality of network stack containers, wherein each of the plurality of sockets corresponds to a different logical network;
   based on identification of a socket of the plurality of sockets with data for network processing,
      identify which of the plurality of network stack containers encapsulates the identified socket;
      determine whether a thread of a plurality of threads allocated to the application instance is assigned to the identified network stack container;
      based on a determination that a thread of the plurality of threads is assigned to the identified network stack container, task the thread with processing the data within the identified network stack container; and
      based on a determination that a first thread of the plurality of threads is not assigned to the identified network stack container, request assignment of the first thread to the identified network stack container and task the first thread with processing the data within the identified network stack container after assignment.

9. The one or more non-transitory machine-readable media of claim 8, wherein the program code to request assignment of the first thread of the plurality of threads to the identified network stack container further comprises program code to invoke a system call with an argument that identifies the network stack container.

10. The one or more non-transitory machine-readable media of claim 8 further comprising program code to register the plurality of sockets with a monitoring service of an operating system that identifies a first socket to the application instance when data is detected for the first socket.

11. The one or more non-transitory machine-readable media of claim 8, wherein the program code to identify which of the plurality of network stack containers encapsulates the identified socket further comprises the program code to access socket structures of the plurality of sockets to read identifiers of the corresponding network stack containers.

12. The one or more non-transitory machine-readable media of claim 8, wherein the program code to determine whether a thread of a plurality of threads allocated to the application instance is assigned to the identified network stack container further comprises the program code to access thread-local storage of the plurality of threads to read identifiers of the network stack containers.

13. An apparatus comprising:
    a processor;
    a machine-readable medium comprising program instructions executable by the processor to cause the apparatus to,
    detect data for network processing at a first of a plurality of sockets created by an application instance;
    identify a first network stack instance of a plurality of network stack instances corresponding to the first socket, wherein each of the plurality of sockets corresponds to a different logical network;
    determine whether one of a plurality of threads is already assigned to the first network stack instance, wherein the plurality of threads have been allocated to the application instance;
    based on a determination that a first of the plurality of threads is assigned to the first network stack instance, task the first thread with processing the data according to the first network stack instance; and
    based on a determination that no thread is assigned to the network stack instance, invoke a system call to assign one of the plurality of threads to the first network stack instance and task the one of the plurality of threads with processing the data according to the first network stack instance.

14. The apparatus of claim 13, wherein the program instructions to detect data for network processing at the first socket further comprises program instructions executable by the processor to cause the apparatus to register the plurality of sockets with a monitoring service of an operating system.

15. The apparatus of claim 14, wherein the program instructions to identify the first network stack instance further comprises program instructions program instructions executable by the processor to cause the apparatus to access a socket structure of the first socket to read a variable that identifies the first network stack instance.

16. The apparatus of claim 15, wherein the variable identifies the first network instance with an identifier of a logical encapsulation that isolates the first network instance from others of the plurality of network instances.

17. The apparatus of claim 13, wherein the program instructions based on a determination that that the first of a plurality of threads is assigned to the first network stack instance further comprises program instructions program instructions executable by the processor to cause the apparatus to access thread-local storage of the plurality threads to determine whether a variable in the thread-local storage identifies the first network stack instance.

18. The apparatus of claim 13, wherein the program instructions to identify the first network stack instance further comprises program instructions executable by the processor to cause the apparatus to:
   determine a logical network identifier associated with the first socket and with the logical network identifier.

19. The apparatus of claim 13, wherein program instructions executable by the processor are included in the application instance.

20. The apparatus of claim 13, wherein the machine-readable medium further comprises program instructions executable by the processor to create the network stack instances.

* * * * *